April 29, 1952  E. C. CRIPE  2,594,610
IDENTIFICATION MEANS FOR STRANDED CABLES
Filed Aug. 7, 1950
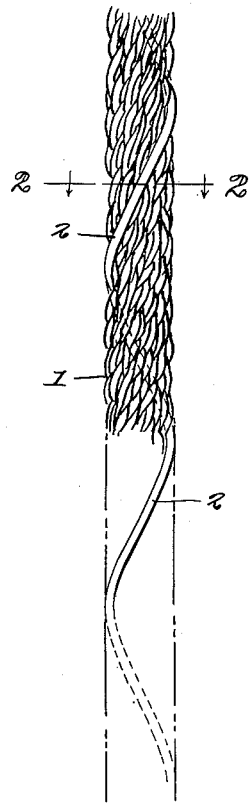
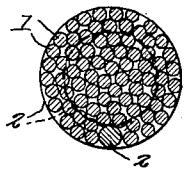
E. C. Cripe
INVENTOR
BY *Clanow+Co.*
ATTORNEYS.

Patented Apr. 29, 1952

2,594,610

UNITED STATES PATENT OFFICE 2,594,610

IDENTIFICATION MEANS FOR STRANDED CABLES

Earnest C. Cripe, Goshen, Ind.

Application August 7, 1950, Serial No. 178,096

1 Claim. (Cl. 57—139)

This invention relates to stranded or twisted cable. More particularly the invention has reference to a means for identifying cable throughout its length, that is, the provision on cable of this type of longitudinally extending surfaces on which a trade-mark or other identifying information can be impressed or otherwise provided.

Twisted cable comprises a plurality of strands which individually are of a gauge so small as to make difficult and in most cases impossible the task of imprinting a trade-mark or other identification upon the cable.

The main object of the present invention is, accordingly, the provision of a means embodied in cable of the type stated that will allow for such identification.

Another important object is the provision of a means of the type stated which is incorporated in the cable construction during the normal stranding operation, utilizing conventional stranding machines.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings

Figure 1 is a side elevational view of a portion of cable formed in accordance with the present invention.

Fig. 2 is an enlarged section on line 2—2 of Fig. 1.

Referring to the drawings in detail, a conventional portion of twisted cable is illustrated thus embodying the twisted strands 1 which, in a cable of approximately one half inch diameter, may be thirty to forty in number and individually would be of approximately 17 gauge. These strands are heavily interlaced or twisted by regular stranding machines.

A single strand, accordingly, has its major portion disposed internally of the cable, and only short widely spaced parts of the lengths of each strand come to the surface during the stranding operation and are exposed. It therefore becomes difficult, not only by reason of the thinness of an individual strand, but also, by reason of the fact that only a small part of the total length of each strand is exposed, to impress a trade-mark or other identification thereupon.

Accordingly, I provide the identification strand 2, there being a single strand 2 upon the cable, this strand being disposed externally of the cable for the entire length of said strand and cable, and being wound spirally upon the cable as particularly well shown in Fig. 2. The strand 2 is recessed in said external surface of the cable as best shown in Fig. 2, so that no part of the strand 2 projects beyond the outer diameter of the cable.

Additionally, the strand 2 is of substantially greater diameter than the diameter of any single strand 1, and thus is of a thickness which will permit the ready imprinting, impressing, or cutting of identification initials or trade-marks into its surface. These marks may or may not be applied prior to spiral wrapping of the strand upon the cable. In any event, the strand provides regularly spaced identification marks extending the full length of the cable, so that said cable can be cut to any selected lengths and will still show the manufacturer's trade-mark or identification from end to end of the cut length.

What is claimed is:

The combination, with a length of stranded wire cable formed from a plurality of inter-twisted strands of small diameter having spaced portions exposed externally of the cable, intervening portions of the respective strands being concealed within the cable, of an identification strand substantially greater in diameter than any of said inter-twisted strands, said identification strand being wrapped spirally upon the cable and being exposed on the external surface of the cable for its entire length, said identification strand being recessed in the exterior surface of the cable so that no portion thereof projects beyond the outer diameter of said cable, said first-named strands being intertwisted with one another independently of the identification strand, and the identification strand being wrapped spirally upon the exterior surface of the cable formed by the inter-twisted strands.

EARNEST C. CRIPE.

REFERENCES CITED

The following references are of record in the file of this patent:

UNITED STATES PATENTS

| Number | Name | Date |
|---|---|---|
| 1,854,350 | Schweitzer | Apr. 19, 1932 |
| 2,055,776 | Saladino | Sept. 29, 1936 |
| 2,088,822 | Saladino | Aug. 3, 1937 |
| 2,372,868 | Warren, Jr. | Apr. 3, 1945 |